3,171,743
PROCESS OF FORMING LATENT AND VISIBLE IMAGES IN REFRACTIVE IMAGE FILMS
Warner L. Peticolas, San Jose, Calif., assignor to International Business Machines Corporation, New York, N.Y., a corporation of New York
No Drawing. Filed Feb. 23, 1962, Ser. No. 175,297
4 Claims. (Cl. 96—49)

This invention relates to refractive image-forming photographic films. More particularly, it relates to forming invisible images in refractive image-forming films and the later development of these films.

Prior to this invention, no one has been able to form latent images in refractive image-forming films because the gas needed to form the required bubbles within the film escaped from the film if the film was not immediately processed.

I have now discovered that essentially invisible images can be formed in refractive image-forming films which can be developed at a later date. Essentially, the invention comprises exposing a refractive image film to image-defining electromagnetic radiation to form a gas in the exposed area of the film, relaxing the film to form permanent, substantially invisible bubbles in the exposed area of the film, supersaturating the film with an inert gas from an external source, and relaxing the film to develop a visible image corresponding to the latent image without forming bubbles uniformly throughout the film.

It is surprising that the effective speed of the film is increased by my new process. Apparently, the invisible bubbles act as nucleating centers for gases which flow into the bubbles from the external source.

This effect generally allows a visible image to be formed by substantially less thermal energy than is required to fog the image background.

The exact amount of heat required for a desired optical density or to fog the image background of a particular film can readily be determined by routine tests.

The following definitions will aid in understanding this invention. The term "bubbles" includes not only spheroids but also more irregular cavities. The bubbles may completely or partially enclose a nucleating particle. The term "invisible bubbles" is meant to include not only completely invisible bubbles, but also bubbles that form haze in the film. The term "substantially invisible" will be used on occasion to describe a haze in exposed areas of the film. The verb "relax" includes any treatment of a refractive image forming film which causes the formation of bubbles within the film. Generally, but not necessarily, "relaxation" is accomplished by heating a film containing a gas under pressure to soften the polymer and thereby allow the gas to form bubbles. "Relaxation" is generally accomplished at temperatures below the second order transition point of the polymer. Where the pressure within the film is sufficient, "relaxation" can also be accomplished by subjecting the film to high vacuum or by placing the film in a vapor of a solvent or plasticizer for the film, etc. Electromagnetic radiation is meant to include radiant energy from X-rays to infra-red of sufficient energy to form a gas or a liquid capable of volatilization at temperatures below the melting point of the polymer.

Several types of film are included within the definition of the "refractive image forming films." These films and processes for their utilization are discussed in the following paragraphs.

The usual diazo sensitized film, for example, a film of polyvinyl chloride, containing about 5–10% by weight and preferably about 6–8% by weight p-dimethylaminobenzene diazonium zinc chloride salt, can be utilized by exposing the film to image-defining light for about 10–30 seconds and heating the film to form invisible bubbles within the exposed area of the film. The film can be developed later by uniformly supersaturating the film with an inert gas such as carbon dioxide at 500 p.s.i., and subsequently heating the film to form visible bubbles in the area of the latent image.

In another useful film, a low boiling liquid, such as acetone or dichloro difluoromethane is suspended in a solid polymer matrix such as polystyrene. On heating through a stencil, the entrapped liquid gasifies. The temperature is raised until invisible bubbles of desired size are blown in the plastic matrix. The temperature is then reduced to a temperature above the boiling point of the dispersed phase liquid, but below that temperature required to soften the polymer matrix and the gas allowed to escape from the film. The latent image in the film is later developed by supersaturating the film with an inert gas and heating the film in a step analogous to that in the development of the diazo-containing film.

In still another film, a polymer such as polymethyl isopropenyl ketone and magnesium carbonate particles having a diameter of 0.2–0.3 micron are interspersed in a matrix polymer such as polyvinyl chloride. On exposure to ultraviolet light, the polymethyl isopropenyl ketone reverts to the monomer, methyl isopropenyl ketone. The monomer is vaporized by heat to form the desired invisible bubbles. The film can be submerged in liquid $CO_2$ and heated to develop the latent image.

A cast sheet of polymethyl $\alpha$-chloroacrylate, or other lower alkyl ester of $\alpha$-chloroacrylic acid, is useful as a thermographic film in our process. The cast film is heated through an insulating stencil to about 220° C. for about 1.15 to 1.25 minutes to form a latent image which can be further developed by soaking the film in $CO_2$ at 1000 p.s.i. and heating the film until a desired density image is achieved.

In all the above films and processes, the gas which forms the invisible bubbles can be allowed to diffuse from the refractive-image forming film prior to developing a visible image corresponding to the invisible latent image.

Photographic film matrices which can be used with my invention includes polymers which are sufficiently flexible at elevated temperatures to form bubbles without shattering the polymer into comminuted particles or loosely joined fragments. The polymer should have a low diffusion rate for the gas being utilized as the developing agent; i.e., the gas should diffuse slowly through the polymer. Such polymers include polycarbonates, polyvinyl chloride, polyvinylidene chloride, co-polymers of these halo polymers, polyesters such as polyethylene glycol terephthlate, polymethyl $\alpha$-chloro acrylate, polystyrene, acrylonitrile, and polymethylmethacrylate.

Gases suitable for use in developing the latent refractive images are non-reactive with the polymer containing the latent images at temperatures utilized in the developing process. These gases include nitrogen, the noble gases, such as neon, krypton and helium; carbon dioxide and mixtures of the above; for example air. The Freons, e.g., dichloro difluoro methane and other low molecular weight polyfluoro and polyfluoro chloro and bromo compounds are also useful. I prefer to utilize nitrogen, argon, carbon dioxide and the Freons as developing gases.

The inert gases can be introduced into the film containing the latent image at any temperature below the melting point of the polymer at which the bubbles remain stable. The particular pressure utilized will depend upon the desired saturation rate, the temperature of the polymer, and the chemical composition of the polymer, per se. Thus, a plastic can be supersaturated under 1000 p.s.i. inert gas pressures at temperatures near the second order transition point of the polymer much faster than it can be supersaturated at room temperature and 500 p.s.i. gas pressure at room temperature. Gas pressures of from about 8 to in excess of 1000 atmospheres are operative in the process of the invention, but I prefer to utilize pressures in excess of about 30 atmospheres. Once the inert gas supersaturated polymer is developed at temperatures below the melting point of the polymer, and preferably below the second order transition point of the polymer, the development can be carried out by a number of methods. For example, the film can be heated under high vacuum to obtain faster development of the film. The supersaturated film can be heated in an inert fluid bath to a temperature at which the image is developed, or supersaturated with an inert gas to the extent that it foams at room temperature when the external pressure is removed.

Generally, the inert supersaturating gas remains in the film a period of time ranging from a few minutes to a few days at ambient room temperatures and pressures, depending primarily on the diffusion rate of the supersaturating gas through the polymer.

Generally speaking, the diameter of the invisible bubbles must be on the order expressed by the relationship to $\gamma/p$ where $\gamma$ is the surface tension of the polymeric matrix in dynes and $p$ is the pressure in millimeters of mercury of the bubble-forming gas within the matrix. For example, where a film has a surface tension of 30 dynes/cm. and an internal gas pressure of 30 atmospheres' gauge, the minimum bubble diameter would be $0.02\mu$. The bubbles forming these microcavities should be no larger than about 0.5 micron in diameter as the bubbles become visible when the diameter is in excess of about this diameter.

The minimum bubble diameter required to insure a permanent bubble varies with the polymer, the amount of plasticizer in the molecule matrix, the temperature, the gas pressure, the diffusion rate of the gas through the polymer, and other factors.

The required exposure time, heat development temperatures, etc., vary with the polymer mixtures, the blowing gas, and the amount of plasticizer in the polymer. To formulate a set of operable conditions for each of the many photo or heat decomposable materials and polymer combinations would be impossible.

A certain skill on the part of those skilled in the art is required to formulate a set of specific conditions for the development of appropriate cavities in the polymer matrices. However, the necessary conditions for each system can readily be determined by a series of routine experiments requiring only pedestrian skill.

The following examples more fully illustrate my invention, but it is not intended that my invention be limited to the exact examples shown, but rather that my invention encompass all equivalents obvious to those skilled in the art.

Example I

Several experiments were carried out utilizing Kalvar Corporation 7BT Film. This film is made up of about 7% by weight p-dimethylaminobenzene diazonium chloride zinc salt suspended in a film of a mixture of polyvinyl chloride and polymethyl methacrylate. In the experiment, razor blades were placed on film strips and the film exposed to radiation from a 250 w. General Electric U-Varc Lamp for a number of seconds. The film was heated for 15 seconds in a diethylbenzene bath having a temperature of 85° C. to form a latent image. The films were then placed in a pressure bomb and pressured with carbon dioxide from a nearly new bottle for eight minutes and subsequently heated for two seconds in a glycol bath at 115° C. to form a developed image. The following table sets out the exposure time and descriptions of the latent and developed image:

| Exposure Time | Latent Image | Developed Image |
| --- | --- | --- |
| 5 | Invisible | Faint but easily discernible. |
| 10 | Very faint haze | Image more dense. |
| 20 | ----do---- | Easily visible. |
| 40 | Faint, but more visible | Dense image. |

Example II

In an experiment similar to that of Example I, various film strips were exposed to ultraviolet light for varying periods of time and a latent image formed by heating the film in a diethylbenzene bath having a temperature of 85° C. for 15 seconds. The films were then submerged in liquid carbon dioxide for eight minutes and dipped in a 115° C. glycol bath for two minutes to develop the image. The following table sets out the exposure time and the diffuse densities of the latent and developed images:

| Exposure Time (Seconds) | Diffuse Density of the Latent Images | Diffuse Density of the Developed Images |
| --- | --- | --- |
| 0 | 0.06 | 0.13 |
| 5 | 0.10 | 0.27 |
| 10 | 0.19 | 0.32 |
| 20 | 0.33 | 0.43 |
| 40 | 0.40 | 0.49 |

Now, having described my invention, what I claim is:
1. A process comprising:
exposing a refractive image film, containing a polymeric matrix and at least one material which will decompose on exposure to electromagnetic radiation to image defining electromagnetic radiation;
relaxing the entire film whereby said decomposed material coagulates to form a permanent latent image of substantially invisible bubbles in the exposed areas of the film;
subjecting said film to a pressurized atmosphere of a gas which is inert relative to said film whereby said film is supersaturated with said gas; and
relaxing the entire film to form a visible image in only the areas of the film exposed to electromagnetic radiation.

2. The process of claim 1 wherein the bubbles comprising the latent image have a minimum diameter at least on the order expressed by the relationship to $\gamma/p$ where $\gamma$ is the surface tension of the polymeric matrix in dynes and $p$ is the pressure in millimeters of mercury in the bubble forming gas, and a maximum diameter of about 0.5.

3. The process of claim 1 wherein a diazonium compound is the electromagnetic radiation decomposable material.

4. The process of claim 1 wherein a polymer sensitive to ultraviolet radiation is the electromagnetic radiation decomposable material.

(References on following page)

References Cited by the Examiner

UNITED STATES PATENTS

| | | | |
|---|---|---|---|
| 2,318,352 | 5/43 | Alink | 96—91 X |
| 2,703,756 | 3/55 | Herrick et al. | 96—49 |
| 2,709,654 | 5/55 | Guth. | |
| 2,911,299 | 11/59 | Baril et al. | 96—49 |
| 3,032,414 | 5/62 | James et al. | 96—91 |
| 3,091,532 | 5/63 | Michaelsen | 96—115 X |
| 3,120,437 | 2/64 | Lindquist | 96—91 X |

FOREIGN PATENTS

| | | |
|---|---|---|
| 645,825 | 11/50 | Great Britain. |
| 850,954 | 10/60 | Great Britain. |

OTHER REFERENCES

Lindquist et al.: IBM Technical Disclosure Bulletin, vol. 4, No. 2, page 61, July 1961.

Peticolas et al.: IBM Technical Disclosure Bulletin, vol. 4, No. 7, page 83, December 1961.

Lindquist: IBM Technical Disclosure Bulletin, vol. 3, No. 2, page 3, July 1960.

NORMAN G. TORCHIN, *Primary Examiner.*